United States Patent
Misra et al.

(10) Patent No.: US 11,347,855 B2
(45) Date of Patent: May 31, 2022

(54) DATA LINEAGE MANAGEMENT

(71) Applicant: Capital One Services, LLC, McLean, VA (US)

(72) Inventors: Anindya Misra, Arlington, VA (US); Harshit Krishna, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/706,943

(22) Filed: Dec. 9, 2019

(65) Prior Publication Data

US 2020/0410101 A1 Dec. 31, 2020

Related U.S. Application Data

(63) Continuation of application No. 16/453,465, filed on Jun. 26, 2019, now Pat. No. 10,503,905.

(51) Int. Cl.
| | |
|---|---|
| *G06F 21/57* | (2013.01) |
| *G06F 8/65* | (2018.01) |
| *H04L 9/06* | (2006.01) |
| *H04L 9/32* | (2006.01) |
| *G06F 16/17* | (2019.01) |

(52) U.S. Cl.
CPC .............. *G06F 21/57* (2013.01); *G06F 8/65* (2013.01); *G06F 16/1734* (2019.01); *H04L 9/0643* (2013.01); *H04L 9/32* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 10,419,446 B2* | 9/2019 | Reddy | H04L 41/5019 |
| 10,503,905 B1 | 12/2019 | Misra | |
| 2008/0040388 A1* | 2/2008 | Petri | G06F 16/1734 |
| 2013/0246560 A1 | 9/2013 | Feng et al. | |
| 2016/0283920 A1* | 9/2016 | Fisher | H04L 9/3297 |
| 2017/0054611 A1 | 2/2017 | Tiell et al. | |
| 2017/0126702 A1 | 5/2017 | Krishnamurthy | |

(Continued)

FOREIGN PATENT DOCUMENTS

| | | |
|---|---|---|
| WO | 2017218984 A1 | 12/2017 |
| WO | WO-2018126837 A1 * 7/2018 | ............ H04L 29/08 |

*Primary Examiner* — Daxin Wu
(74) *Attorney, Agent, or Firm* — Harrity & Harrity, LLP

(57) ABSTRACT

A device may log update information associated with an operation, wherein the update information identifies one or more changes made to the dataset during the operation and a source of the operation. The device may identify, based on identification information associated with the dataset, a lineage record identifier associated with the dataset. The device may generate a lineage record associated with the operation, wherein the lineage record includes the lineage record identifier and the update information. The device may send a request for validation to an authorized node to validate the lineage record, wherein the authorized node is authorized to access the dataset. The device may store, based on the lineage record being validated by the authorized node, the lineage record in a distributed ledger, wherein the distributed ledger is accessible to a plurality of nodes to enable the plurality of nodes to access the update information.

20 Claims, 10 Drawing Sheets

(56) References Cited

U.S. PATENT DOCUMENTS

| | | | |
|---|---|---|---|
| 2018/0117447 A1* | 5/2018 | Tran | G16H 10/60 |
| 2018/0248701 A1* | 8/2018 | Johnson | H04L 9/3236 |
| 2018/0253464 A1 | 9/2018 | Kohli et al. | |
| 2018/0323964 A1* | 11/2018 | Watanabe | G06Q 20/065 |
| 2018/0323980 A1* | 11/2018 | Ahn | G06F 21/6209 |
| 2018/0329693 A1 | 11/2018 | Eksten et al. | |
| 2018/0375840 A1 | 12/2018 | Moy et al. | |
| 2019/0058590 A1* | 2/2019 | Watanabe | G06Q 20/0658 |
| 2019/0102423 A1 | 4/2019 | Little et al. | |
| 2019/0123889 A1* | 4/2019 | Schmidt-Karaca | H04L 9/3239 |
| 2019/0188046 A1 | 6/2019 | Florissi et al. | |
| 2019/0378139 A1* | 12/2019 | Stribady | H04L 63/12 |
| 2020/0026785 A1* | 1/2020 | Patangia | H04L 63/123 |
| 2020/0076576 A1* | 3/2020 | Ahlback | H04L 9/0637 |

* cited by examiner

DATA LINEAGE MANAGEMENT

RELATED APPLICATION

This application is a continuation of U.S. patent application Ser. No. 16/453,465, filed Jun. 26, 2019 (now U.S. Pat. No. 10,503,905), which is incorporated herein by reference.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some implementations, a method may include detecting an operation associated with updating a dataset; obtaining, based on detecting the operation, metadata associated with the dataset, wherein the metadata includes identification information associated with the dataset; determining update information associated with the operation, wherein the update information identifies one or more changes made to the dataset during the operation and a source of the operation; validating the update information to verify an accuracy of the update information; determining, based on validating the update information and using a software development kit (SDK), a lineage record identifier for the dataset based on the identification information, wherein the SDK is associated with a distributed ledger; generating, using the SDK, a lineage record associated with the operation, wherein the lineage record is generated using the lineage record identifier, and wherein the lineage record includes a hash of the update information; and causing, using a call of the SDK, the lineage record to be stored in the distributed ledger, wherein the distributed ledger includes a plurality of lineage records associated with a plurality of operations involving the dataset, and wherein one or more of the plurality of lineage records are accessible to a plurality of nodes.

According to some implementations, a device may include one or more memories, and one or more processors, communicatively coupled to the one or more memories, configured to: detect an operation associated with updating a dataset, wherein the dataset is associated with an online platform; obtain, based on detecting the operation, metadata associated with the dataset, wherein the metadata includes identification information for the dataset and update information associated with the dataset, and wherein the update information identifies one or more changes made to the dataset during the operation; determine a lineage record identifier for the dataset based on the identification information; generate a lineage record associated with the update, wherein the lineage record comprises a hash of: the lineage record identifier, the update information, and a source identifier associated with a source of the operation; cause the lineage record to be stored in a distributed ledger, wherein the distributed ledger includes a plurality of lineage records associated with operations involving a plurality of datasets, and wherein one or more of the plurality of lineage records are accessible to a plurality of nodes; and transmit a notification to an authorized node, of the plurality of nodes, to indicate that the lineage record is stored in the distributed ledger.

According to some implementations, a non-transitory computer-readable medium may store one or more instructions. The one or more instructions, when executed by one or more processors of a device, may cause the one or more processors to: perform an operation on a dataset; log update information associated with the operation, wherein the update information identifies one or more changes made to the dataset during the operation and a source of the operation; identify, based on identification information associated with the dataset, a lineage record identifier associated with the dataset; generate a lineage record associated with the operation, wherein the lineage record includes the lineage record identifier and the update information; send a request for validation to an authorized node to validate the lineage record, wherein the authorized node is authorized to access the dataset; and store, based on the lineage record being validated by the authorized node, the lineage record in a distributed ledger, wherein the distributed ledger is accessible to a plurality of nodes to enable the plurality of nodes to access the update information.

According to some implementations, a method may include accessing a dataset; identifying metadata associated with the dataset, wherein the metadata includes identification information associated with the dataset; determining a lineage record identifier associated with the dataset based on the identification information; identifying blocks of a blockchain that include the lineage record identifier; obtaining, from the blocks of the blockchain, update information associated with the dataset, wherein the update information identifies one or more changes made to the dataset during a time period that corresponds to the blocks of the blockchain; determining a current state of the dataset based on the update information; and performing an action based on the current state of the dataset.

DETAILED DESCRIPTION

Figure 1A:
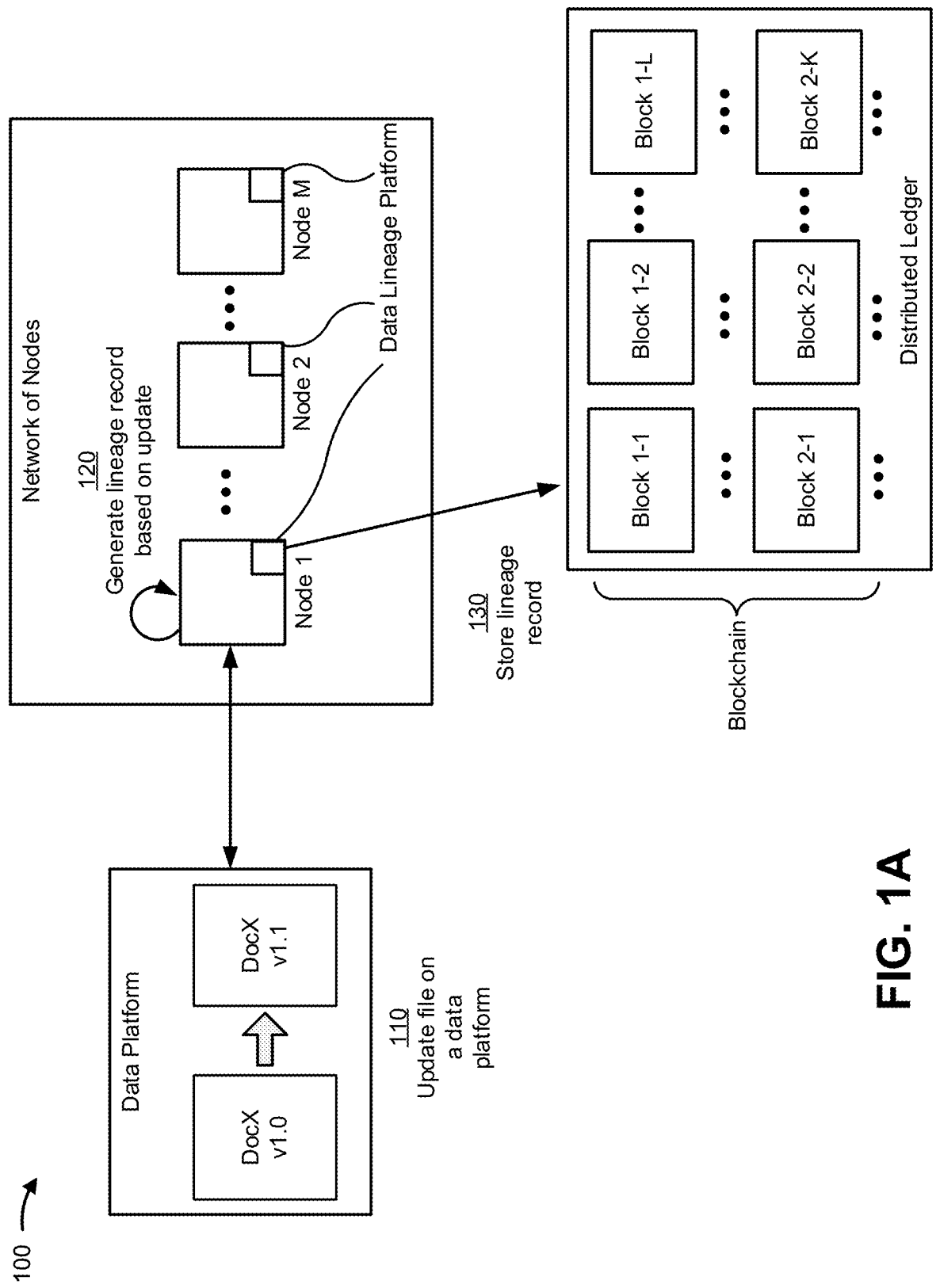
FIGS. 1A and 1B are diagrams of one or more example implementations described herein.

The following detailed description of example implementations refers to the accompanying drawings. The same reference numbers in different drawings may identify the same or similar elements.

In some instances, a data architecture relies on multiple, distributed platforms (e.g., user devices, server devices, cloud-based platforms, web-based platforms, and/or the like) to produce and/or consume data. The data architecture can capture vast amounts of data, in real-time, through a streaming solution (e.g., KAFKA) and store the data in a data lake for various use cases (e.g., machine learning, big data analysis, and/or the like). However, such a data architecture presents an issue with respect to identifying and/or maintaining a flow and transformation of the data (which may be referred to herein as "data lineage") as the data is moved through various platforms and/or is transformed for consumption via the various platforms. A centralized data architecture may be able to identify and/or maintain information associated with data lineage (referred to herein as "data lineage information") via an extract, transform, load (ETL) solution that persists configuration files in storage of the centralized architecture. However, due to the inherent nature of a data architecture that utilizes multiple, distributed platforms (i.e., the fact that the platforms are distributed), such a solution may be ineffective as the multiple platforms can be simultaneously and independently accessing and/or transforming the data.

According to some implementations described herein, a data lineage platform may identify and/or maintain data lineage of a dataset (e.g., a set of data, a data file, and/or the like) in a distributed environment. For example, the data lineage platform may identify update information associated with an operation involving the dataset. In some implementations, the update information may be obtained and/or generated from a log (e.g., a log that is maintained by an application used to perform the update) that identifies one or more scripts, queries, operations, jobs, and/or the like associated with the update. The data lineage platform may utilize a software development kit (SDK) to identify the update to the dataset and correspondingly determine, generate, and/or store a lineage record in association with the update to the dataset. As described herein, such an SDK may implement one or more tools (that perform one or more calls to the distributed ledger) that are integrated with the distributed ledger to ensure that data lineage information is accurately maintained as a dataset is accessed, copied, changed, cloned, and/or the like.

As described herein, the data lineage platform may maintain lineage records using a distributed ledger. According to some implementations, the distributed ledger may enable a network of nodes, that have access to the distributed ledger, to access the lineage records. The network of nodes may correspond to one or more devices associated with one or more entities (e.g., devices owned, operated, and/or maintained by the one or more entities) that are authorized to access or are capable of accessing the distributed ledger. In some implementations, the network of nodes may have various levels of access capabilities that may permit the network of nodes to view (e.g., read the distributed ledger) lineage records in the distributed ledger and/or add (e.g., write to the distributed ledger) lineage records to the distributed ledger. In this way, the data lineage platform provides accessibility (e.g., to any authorized entity, from any device capable of accessing the distributed ledger, regardless of time, location, and/or the like) to information (e.g., data lineage information associated with a dataset) in the distributed ledger.

Furthermore, the data lineage platform may use the distributed ledger to secure the data lineage information. For example, the distributed ledger may be immutable, such that no entity can edit, revise, and/or update an entry in the distributed ledger. For example, the distributed ledger may be a blockchain. In such cases, the lineage records may be implemented within one or more blocks linked together in the blockchain. For example, a new transaction may be added to a block of the blockchain for a lineage record when a dataset is updated (e.g., moved, transformed, and/or the like), as described herein. In this way, the lineage records can be secured in the distributed ledger while providing transparency of a history of the dataset.

In some implementations, the distributed ledger may store hundreds, thousands, millions, or more lineage records associated with hundreds, thousands, millions, or more datasets. Additionally, or alternatively, the distributed ledger may store hundreds, thousands, millions, or more lineage records associated with hundreds, thousands, millions, or more datasets that are associated with hundreds, thousands, millions, or more entities. As described herein, the data lineage platform may process hundreds, thousands, millions, or more transactions for lineage records (e.g., corresponding to newly received data lineage information in the distributed ledger). In this way, the data lineage platform, using the distributed ledger, enables management of a plurality of lineage records, regardless of the quantity of the plurality of lineage records.

Accordingly, as described herein, using a distributed ledger, the data lineage platform may maintain data lineage information associated with one or more datasets. In some implementations, the data lineage platform may identify logged update information associated with an operation involving a dataset, determine a lineage record identifier for the dataset, generate a lineage record for the dataset, and store the lineage record in the distributed ledger. Furthermore, the lineage record, prior to being stored in the distributed ledger, may be validated by one or more authorized nodes associated with one more authorized entities that are associated with the dataset. Accordingly, via the distributed ledger, the data lineage platform enables multiple entities that have authorized access to a particular dataset to securely generate, maintain, and/or access data lineage information associated with the dataset, as described herein.

As described herein, to identify and/or provide information associated with a dataset (or an update to the dataset), the data lineage platform may look up transactions in the distributed ledger that include a particular lineage record identifier. Accordingly, the distributed ledger may provide a scalable structure that is used to identify a dataset (e.g., using a mapping of a lineage record identifier to an identification of the dataset, and/or the like) and enable one or more entities (that may be distributed nationally, globally, and/or the like) to determine the data lineage information associated with the dataset. Accordingly, the data lineage platform may avoid wasting resources associated with maintaining and/or accessing data lineage information using previous techniques (e.g., because the lineage records are not in relatively inaccessible data structures) by enabling the data lineage information to be accessible to any authorized entities capable of accessing the distributed ledger. Furthermore, the data lineage platform may ensure efficient use of resources (e.g., data storage resources) by increasing accessibility of the data lineage information stored in the lineage records and/or limiting an amount of resources that may be required to store various versions of a dataset. For example, rather than storing multiple versions of a same dataset to track data lineage, some examples herein may enable a single version to be stored, and data lineage information (which uses less resources than a full version of the dataset) can be used to update the single version to a current version, thereby conserving resources that may otherwise be consumed by storing multiple versions of the dataset.

Moreover, the data lineage platform, as described herein, removes complexity with respect to communicating and/or distributing the data lineage information by serving as a platform (associated with one or more nodes that have access to the distributed ledger) that enables on-demand, distributed, remote, and/or scalable access to the data lineage information. Accordingly, from the data lineage information, an entity that has access to the data lineage information, as described herein, can determine a status (e.g., a current status) of the dataset (e.g., using both the data lineage information and a previously known status of the dataset).

Figure 1B:
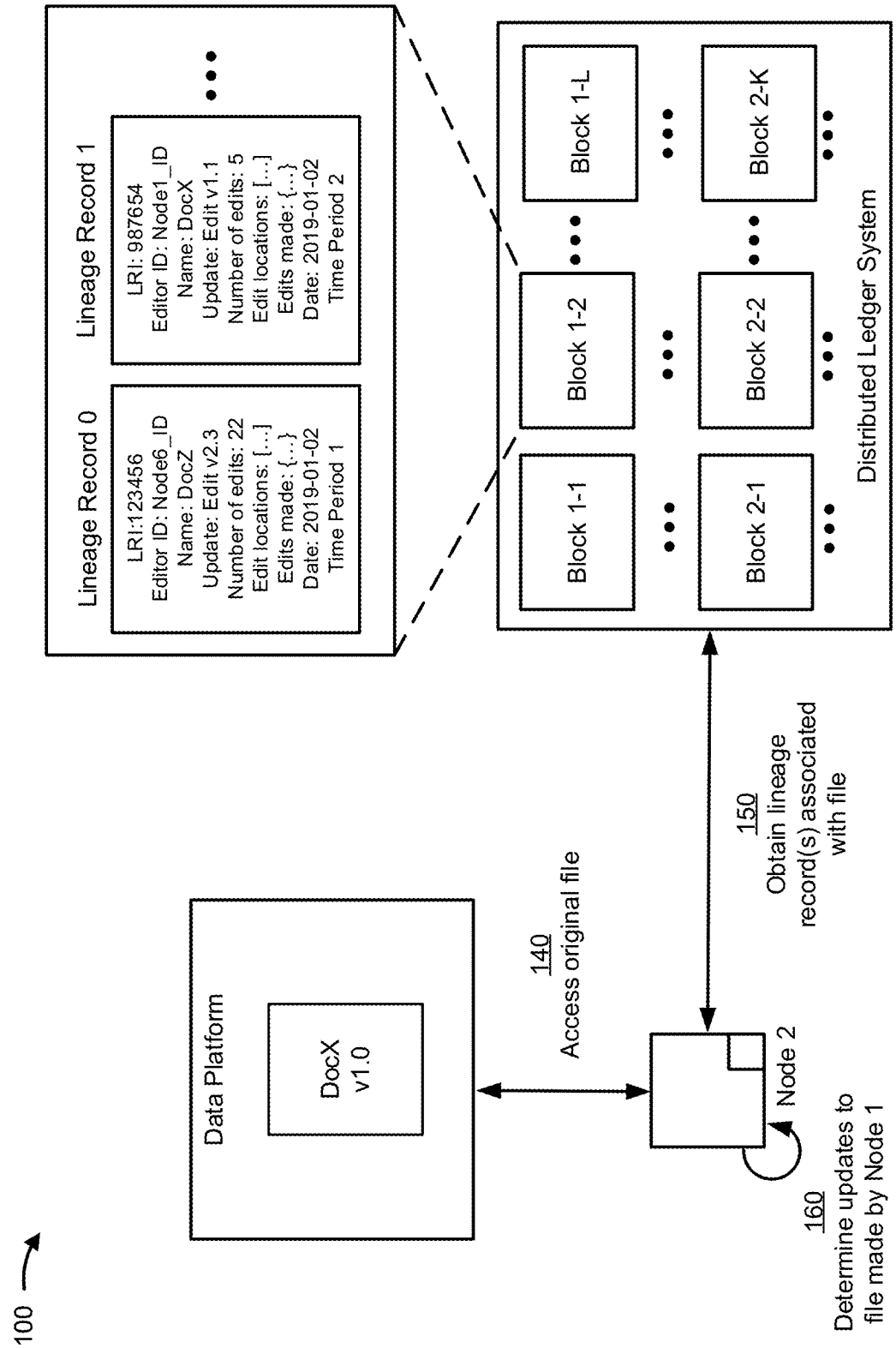

FIGS. 1A and 1B are diagrams of an example implementation 100 described herein. Example implementation 100 may include a data platform, a network of nodes (shown as Node 1, Node 2, . . . , Node M, where M corresponds to the number of nodes in the network of nodes) (referred to individually as a "node" and collectively as "nodes") and a distributed ledger. As described herein, the data platform may manage a file (shown as "DocX") that is accessible to the network of nodes. The file, as described herein, may be updated (e.g., from version 1.0 (v1.0) to version 1.1 (v1.1), as shown) via one or more operations performed by one or more of the nodes of the network of nodes. Furthermore, the nodes may include or be associated with a data lineage platform that maintains, via the distributed ledger, the data lineage information associated with the dataset, as described herein.

Although example implementation 100 is described in connection with a file (e.g., a document file, a media file, and/or the like), examples described in connection with example implementation 100 may similarly apply to any other type of dataset. For example, such types of datasets may include data streams (e.g., a media stream (e.g., an image stream (video), an audio stream, and/or the like), data feeds (e.g., a really simple syndication (RSS) feed), and/or the like), structured datasets (e.g., a database, a table, an index, a graph, and/or the like), unstructured datasets, and/or the like.

In example implementation 100, the distributed ledger may be implemented by and/or include a blockchain. Accordingly, the data lineage platform may use the blockchain to maintain one or more lineage records for the file. Such lineage records may include data lineage information associated with updates to the file. Further, each block of the blockchain may contain update information associated with one or more lineage records (e.g., created via one or more corresponding transactions involving the blockchain) that involve one or more datasets. For example, the one or more lineage records in each block may have been generated and/or stored within a particular time period (e.g., in association with events that occurred within a similar time period). As described herein, a transaction within a block may include identification information associated with the file (e.g., a title, a name, and/or the like) and update information associated with an update to the file (e.g., a type of update, a source of the update, a location of the update, content of the update, a date/time of the update, metadata associated with the update, and/or the like). In some implementations, the update information may include or indicate the status of the file, an address (or other data structure location information) that is associated with the file, a hash of metadata associated with the file, and/or the like.

As shown in FIG. 1A, and by reference number 110, a node, of the network of nodes, updates a file on a data platform. For example, Node 1 may perform an operation on the file via the data platform to access and/or modify the file. Such an operation may include one or more of accessing the file (e.g., performing a read operation), modifying the file (e.g., performing a write operation), transmitting the file, receiving the file, copying the file, and/or the like. The node may perform the operation via an application (e.g., an application hosted by the data platform, an application installed on the node (and/or each of the network of nodes), and/or the like) associated with the data platform. For example, the data platform may be an online platform that hosts the application and enables the node to perform the operation on the file. In some implementations, the node may perform the operation for a specific use or purpose (e.g., that is unique to Node 1). Accordingly, the operation may not be performed to replace the version of the file with an updated version of the file in the data platform (e.g., so as not to affect the original version).

In some implementations, while performing the operation, the node (e.g., via the data lineage platform) and/or the data platform (e.g., via an application of the data platform) may log update information associated with the operation. For example, the update information may identify information associated with the operation, such as one or more changes made to the dataset during the operation, a source of the operation (e.g., Node 1 in example implementation 100), a type of the operation, whether the dataset was transmitted or received by another node during the operation, and/or the like. The update information may be obtained from metadata associated with the file and/or associated with metadata associated with the file. Such metadata may be generated and/or managed by an application used to perform the operation and/or stored in association with the file. For example, the metadata may be stored in a log file of the file. Additionally, or alternatively, the metadata may be stored and/or obtained from a code repository of the data platform. For example, the code repository may indicate code that was executed in association with the operation on the file. Accordingly, the executed code, as stored in the code repository, may include metadata associated with the file and the operation.

In this way, an operation may be performed to update the file and/or may be detected to permit the nodes and/or data lineage platform to generate a lineage record associated with the operation to maintain data lineage of the file.

As further shown in FIG. 1A, and by reference number 120, the node (e.g., via the data lineage platform) generates a lineage record based on the update. For example, the data lineage platform may generate the lineage record based on metadata associated with the update to the file. The lineage record may include a lineage record identifier associated with the file to permit the lineage record to be identified in association with the file. Furthermore, the lineage record may be generated to include update information (and/or a hash of the update information) associated with the operation involved in the update to the file.

According to some implementations, when generating the lineage record, the node may determine a lineage record identifier for the file based on identification information associated with the file. For example, the node may identify, based on identification information associated with the dataset, the lineage record identifier associated with the dataset using a mapping of identification information of datasets (e.g., including the file) to corresponding lineage record identifiers for the datasets. In some implementations, if the mapping does not include a lineage record identifier, the node may generate a new lineage record identifier for the dataset (e.g., using any suitable identifier assignment technique).

In some implementations, the node may utilize an SDK (e.g., corresponding to the data lineage platform) to generate the lineage record. Such an SDK may be associated with the distributed ledger and/or be configured to interact with the distributed ledger (e.g., using one or more calls of the SDK). In some implementations, the SDK may be configured to utilize a particular protocol (e.g., an application protocol associated with the application used to perform the operation on the file) of the data platform to determine content that is to be included in the lineage record. Accordingly, via the SDK may enable integration with the distributed ledger and/or the data platform to permit the nodes to access update information in lineage records stored in the distributed ledger.

As described herein, the node may determine the update information associated with the operation from metadata associated with the file. The node may extract and/or parse the update information from the metadata and generate the lineage record to include the extracted and/or parsed update information. Accordingly, the node may generate the lineage record to include information identifying one or more changes made to the file during the operation and the source of the operation (Node 1). Accordingly, the lineage record may be generated to include information identifying a change to the identification information of the file, a change to a format of the file, a copy of the file being created, an addition of content to the file, a removal of content from the file, a replacement of content in the file, and/or the like.

In some implementations, the node (e.g., via the data lineage platform) may use a hash function to generate the lineage record. For example, using the hash function (e.g., a hash function that is available to each of the nodes), the node may generate the lineage record to include a hash of: the lineage record identifier, the update information, a source identifier associated with the node (as the source of the operation), and/or the like. In this way, using the hash function, such content can be determined, from the lineage record, by the other nodes of the network of nodes.

In some implementations, the node may send a request for validation of the lineage record. For example, the request for validation may correspond to a notification that the operation was performed by the node. For example, the node may request the data lineage platform (e.g., of one or more of the other nodes in the network of nodes) to validate the update information based on an authentication of the node (e.g., a private key, a signature, and/or the like). The authentication may indicate that the node is authorized to perform such an operation on the node. In this way, the operation and/or update information associated with the operation may be validated to verify that the source of the operation is capable of performing the operation. In some implementations, the request may include the update information, the lineage record, a hash of the lineage record, and/or the like. In such cases, the request may permit the data lineage platform and/or one or more of the other nodes of the network of nodes to perform a corresponding update to the version of the file that is available to the data lineage platform and/or the one or more other network nodes.

In this way, the node and/or data lineage platform may generate a lineage record to permit the lineage record to be stored in the distributed ledger and permit each of the network of nodes to determine a current state of the dataset.

As further shown in FIG. 1A, and by reference number 130, the node may store the lineage record in the distributed ledger. For example, the node may perform a transaction involving one or more blocks of the distributed ledger to add the lineage record to the distributed ledger. In some implementations, the node may perform the transaction to store the lineage record via a call to the distributed ledger by an SDK of the node. Such a call may be configured to create a new block in the distributed ledger according to the protocols and/or formatting of the distributed ledger.

The blocks of the distributed ledger may be sorted chronologically, sorted according to location, sorted according to authorizations, and/or the like. A block may include (e.g., store, maintain, and/or the like) one or more lineage records, and each of the lineage records in that block may be associated with one or more datasets. Accordingly, a first lineage record for the update to the file may be included in block 1-1 and a second lineage record for a subsequent update to the file may be included in block 2-2.

In some implementations, the data lineage platform of the node may generate a lineage record using a private key. For example, the data lineage platform may sign and/or certify the lineage record using a private key associated with the node. The private key may correspond to a certification associated with an entity that is authenticated by the node (e.g., via an application of the node, via the node being unlocked via an authentication process involving the entity, and/or the like). Accordingly, via the private key, the data lineage platform may certify that the lineage record was stored and/or created in association with the node (and/or an entity associated with the node). Correspondingly, one or more of authorized entities (associated with corresponding nodes of the network of nodes) may use a public key (e.g., a public key that is paired to the private key) to verify the private key. Accordingly, the authorized entities may verify that the lineage record was generated and/or stored by the node. Furthermore, using the private key/public key pair, the authorized entities may certify that the lineage records are authenticated and/or certified by a trusted entity.

In some implementations, the node may store the lineage record (and/or cause the data lineage platform to store the lineage record) based on the lineage record being validated by one or more nodes of the network of nodes (e.g., using a private/public key pair of the node). For example, based on a response to a notification transmitted to one or more of the network of nodes, that indicates that the lineage record has been validated, the node may correspondingly store the lineage record in the distributed ledger. Accordingly, the update information of the lineage may be verified prior to being immutably stored in a lineage record of the distributed ledger.

In this way, the data lineage platform may maintain one or more lineage records for the file in the distributed ledger to provide secure and scalable accessibility to data lineage information of the file. Accordingly, any authorized entities that are communicatively coupled with the distributed ledger and authorized to access the lineage records can access the data lineage information associated with the file.

As shown in FIG. 1B, and by reference number 140, a node (e.g., Node 2) is to access a file. For example, as shown, the file may correspond to a previous version or original version of the file (DocX v1.0). In some implementations, the node is to access the file to determine whether any operations have been performed on the file by one or more nodes of the network of nodes (e.g., the operation performed by Node 1 to update the file from v1.0 to v1.1).

In some implementations, when accessing the file, the node may identify metadata associated with the file. The metadata may include information that includes identification information associated with the file. Furthermore, such metadata may include information indicating that the file was accessed and/or modified by another node (e.g., Node 1) of the plurality of nodes, as described herein.

In this way, the node may access the file to permit the node to identify updates associated with the file via a lineage record of the distributed ledger.

As further shown in FIG. 1B, and by reference number 150, the node may obtain one or more lineage records associated with the file. For example, the node may determine the lineage record identifier for the file (e.g., using a mapping of the identification information for the file to lineage record identifiers of the lineage records), and access blocks of the distributed ledger that include lineage records having that lineage record identifier. Based on the determined lineage record identifier associated with the file, the node may identify blocks of a blockchain of the distributed ledger that include the lineage record identifier. In some implementations, the one or more lineage records may be most recently generated and/or stored lineage records in the distributed ledger (e.g., which may be stored in most recently created blocks of the distributed ledger). For example, the one or more lineage records may correspond to lineage records that were stored since the node (Node 2) last accessed and/or updated the file (e.g., since the node utilized DocX v1.0).

From the one or more lineage records, the node (Node 2) may obtain update information associated with the file. As described herein, the update information may identify one or more changes made to the dataset during a time period that corresponds to the blocks of the blockchain. In this way, the node may identify whether the file was updated and/or how the file was updated, as described herein.

As further shown in FIG. 1B, and by reference number 160, the node (Node 2) may determine updates to the file made by another node (Node 1). For example, from the update information included in the one or more lineage records, the node may determine whether a different version (e.g., updated version) of the file has been generated according to one or more operations involving the file. Accordingly, Node 2 may determine the type of update performed by node 1 to permit Node 2 use the file (or content of the file) in a similar manner as Node 1.

In some implementations, the node may access the update information in the lineage records to determine a current state of the file (e.g., DocX v1.1) as updated by Node 1. The current state of the file may correspond to a most up-to-date version of the file. In such cases, prior to performing any operations on the file, the node (Node 2) may perform one or more corresponding operations to update the file (e.g., to DocX v1.1) so that any updates to the file are not performed on a version of the file that is different from the most up-to-date version of the file.

In this way, a node may determine whether a file has been updated to perform one or more actions associated with the file, as described herein.

As indicated above, FIGS. 1A and 1B are provided as one or more examples. Other examples may differ from what is described with regard to FIGS. 1A and 1B.

Figure 2:
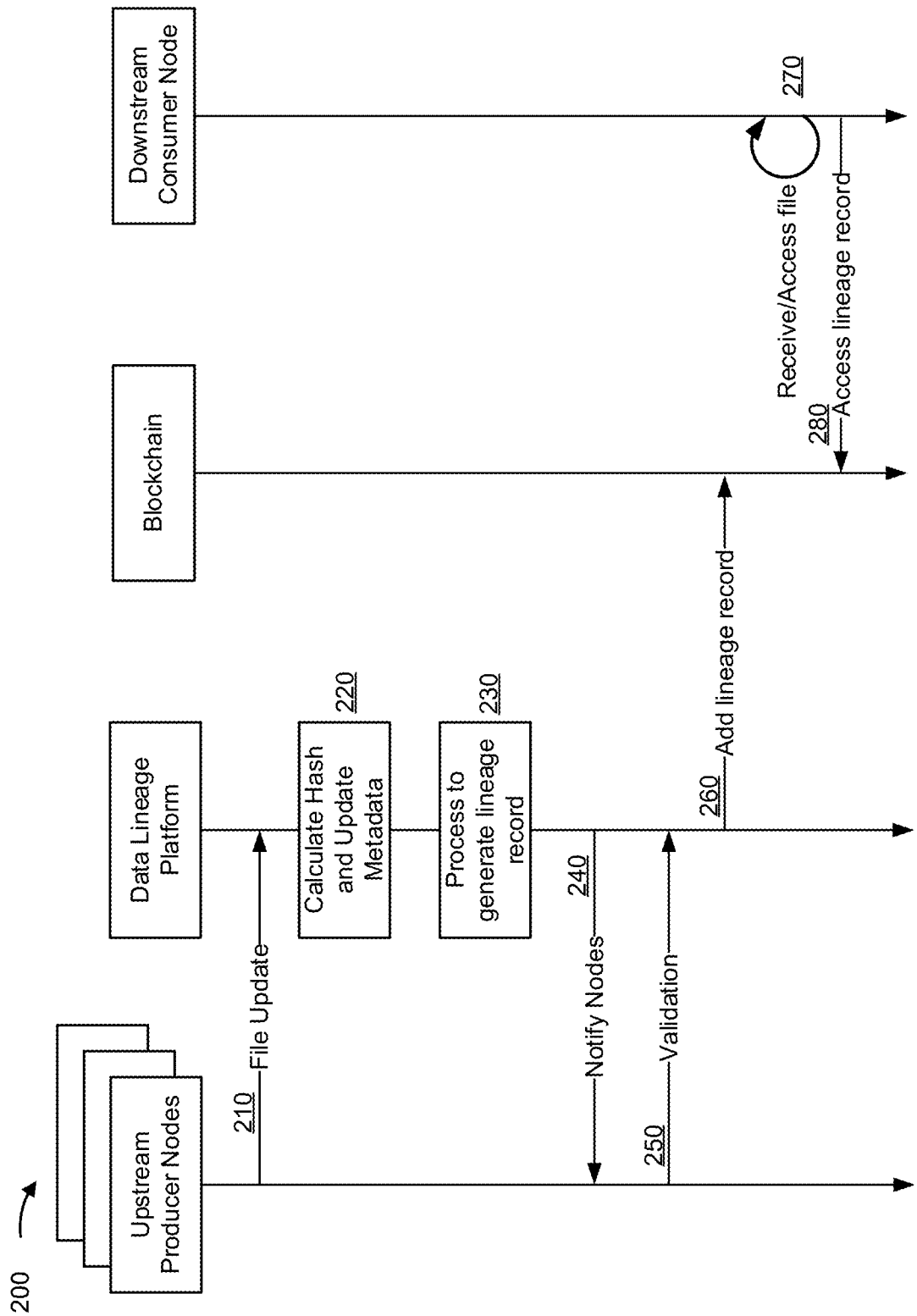
FIG. 2 is a diagram of an example call flow associated with an example implementation described herein.

FIG. 2 is a call flow diagram of an example implementation 200 described herein. Example implementation 200 includes one or more upstream producer nodes (which may correspond to one or more of the nodes of example implementation 100), a data lineage platform (which may correspond to the data lineage platform of example implementation 100), a blockchain, and a downstream consumer node (which may correspond to one or more of the nodes of example implementation 100).

As shown in FIG. 2, and by reference number 210, an update producer node performs an update on a file. To detect the update to the file, the data lineage platform may obtain the file and metadata associated with the file. As shown by reference number 220, the data lineage platform (e.g., using an SDK) may calculate a hash of the file and update the metadata associated with the file. As shown by reference number 230, the data lineage platform may process the file and metadata to generate a lineage record, as described herein.

As further shown in FIG. 2, and by reference number 240, the data lineage platform may notify the other upstream producer nodes of the generated lineage record. For example, the data lineage platform may send a request to the other upstream producer nodes to validate the lineage record (e.g., based on an authentication from the upstream producer node that performed the update). The data lineage platform may receive the validation, as shown by reference number 250, and add the generated lineage record to the blockchain, as shown by reference number 260.

As further shown in FIG. 2, and by reference number 270, the downstream consumer node may receive and/or access the file. As shown by reference number 280, the downstream consumer node may then access (e.g., read, obtain, and/or the like) the lineage record from the blockchain to permit the downstream consumer node to determine details of the update to the file.

In this way, the data lineage platform may use the blockchain to store data lineage information associated with an update to a file that is performed by a node, have one or more nodes validate the data lineage information associated with the update, and permit one or more of the nodes to access the data lineage information to determine a status of the file and/or recreate a version of the file (e.g., by performing corresponding operations of the update that are included in the data lineage information).

As indicated above, FIG. 2 is provided merely as an example. Other examples may differ from what is described with regard to FIG. 2.

Figure 3:
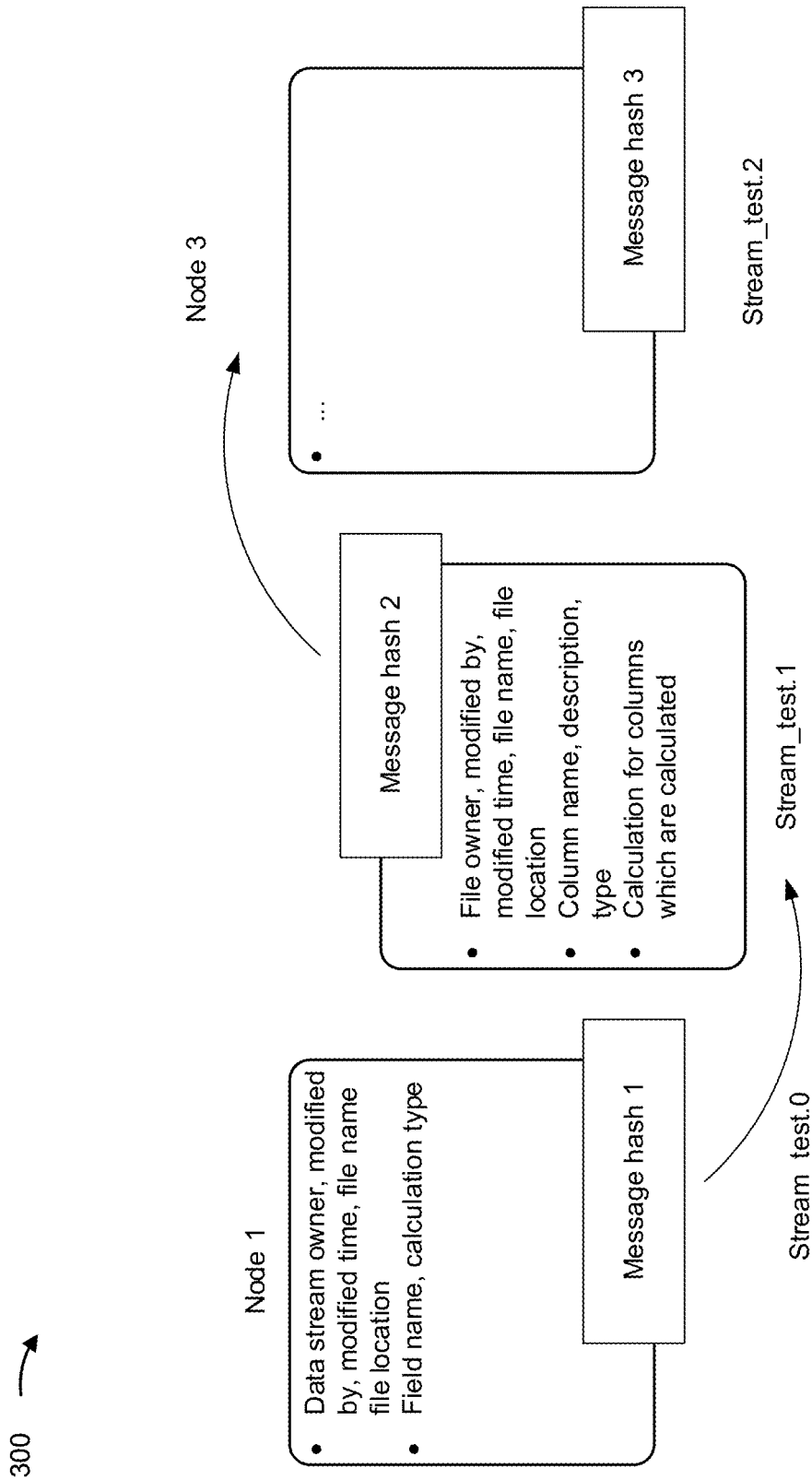
FIG. 3 is a diagram of an example implementation described herein.

FIG. 3 is a diagram of an example implementation 300 described herein. Example implementation 300 illustrates an example flow and/or transformation of data between nodes, as described herein. Example implementation includes a first node (Node 1), a second node (Node 2), and a third node (Node 3) (referred to herein collectively as the "nodes"). The nodes may be nodes in the network of nodes in example implementation 100. Additionally, or alternatively, the nodes may be the upstream producer nodes and/or include the downstream consumer node of example implementation 200.

As shown in FIG. 3, the first node performs Stream_test.0. Based on performing Stream_test.0, the first node generates message hash 1, which may include a hash of information that identifies metadata associated with the file, such as an owner of a data stream, the source of the modification ("modified by"), identification information ("file name"), and an address of the file ("file location"). Furthermore, message hash 1 may include update information that identifies a field of the update ("field name"), a type of calculation for field associated with the update ("calculation type"), and/or the like. The first node may store message hash 1 in a lineage record of a distributed ledger as described herein.

As further shown in FIG. 3, the second node may receive message hash 1 and may make further updates to the file.

The second node may validate the update associated with message hash 1 (e.g., to permit the first node to store the message hash 1 in a lineage record of a distributed ledger, as described herein). Furthermore, the second node may generate message hash 2 associated with the further updates to the file. The generated message hash 2 may include the same metadata associated with the file, and the update information may include information on a column of the file that is changed by the update ("column name, description, and type") and/or calculations for the columns that are to be calculated, and/or content information associated with the update to the columns (e.g., "add column 3," "column 3=column 2−column 1", and/or the like). The second node may store message hash 2 in a lineage record of a distributed ledger as described herein.

As further shown, the third node may receive the message hash 2 and/or access the message hash 1 from the distributed ledger to perform Stream_test.2. The third node may generate a similar message hash 3 based on the update performed to the file via Stream_test.2.

As indicated above, FIG. 3 is provided as one or more examples. Other examples may differ from what is described with regard to FIG. 3.

In this way, some implementations described herein provide a data lineage platform that may use one or more mechanisms in a distributed data architecture to identify updates to a dataset, manage data lineage associated with the dataset, and/or determine a status of the dataset and/or a version corresponding to the data lineage of the dataset. In this way, access to data lineage associated with a dataset can be readily accessible to a network of nodes that are authorized to access the dataset and/or modify the dataset in any manner described herein. Furthermore, the examples associated with the data lineage platform and/or distributed ledger described herein may conserve computing resources and/or network resources associated with logging data lineage information and/or enabling a dataset to be correspondingly updated (e.g., by preventing the need to forward updated versions of the dataset to any or all other nodes of the distributed data architecture).

Figure 4:
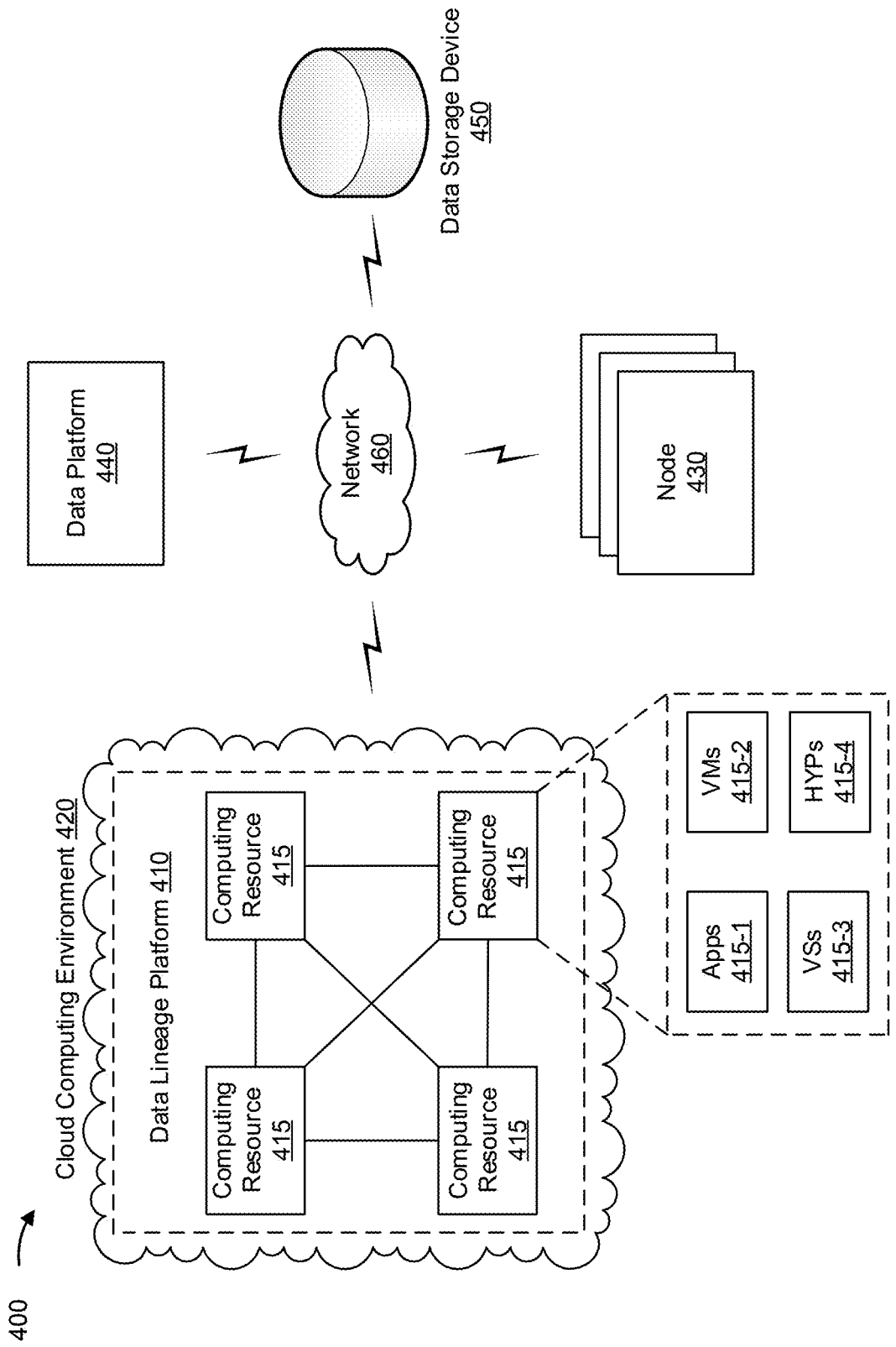
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a data lineage platform 410, a computing resource 415, a cloud computing environment 420, one or more nodes 430 (referred to herein individually as node 430 or collectively as nodes 430), a data platform 440, a data storage device 450, and a network 460. Devices of environment 400 may interconnect via wired connections, wireless connections, or a combination of wired and wireless connections.

Data lineage platform 410 includes one or more computing resources that may detect and/or maintain data lineage of a dataset, as described herein. For example, data lineage platform 410 may be a platform implemented by cloud computing environment 420 that may perform and/or detect an operation associated with the dataset, generate a lineage record associated with the operation, and store the lineage record in a distributed ledger to maintain data lineage associated with the dataset. In some implementations, data lineage platform 410 is implemented by computing resources 415 of cloud computing environment 420.

Data lineage platform 410 may include a server device or a group of server devices. In some implementations, data lineage platform 410 may be hosted in cloud computing environment 420. Notably, while implementations described herein may describe data lineage platform 410 as being hosted in cloud computing environment 420, in some implementations, data lineage platform 410 may be non-cloud-based or may be partially cloud-based.

Cloud computing environment 420 includes an environment that delivers computing as a service, whereby shared resources, services, and/or the like may be provided to manage data lineage information associated with one or more datasets, as described herein. Cloud computing environment 420 may provide computation, software, data access, storage, and/or other services that do not require end-user knowledge of a physical location and configuration of a system and/or a device that delivers the services. As shown, cloud computing environment 420 may include data lineage platform 410 and computing resource 415.

Computing resource 415 includes one or more personal computers, workstation computers, server devices, or another type of computation and/or communication device. In some implementations, computing resource 415 may host data lineage platform 410. The cloud resources may include compute instances executing in computing resource 415, storage devices provided in computing resource 415, data transfer devices provided by computing resource 415, and/or the like. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by node 430. Application 415-1 may eliminate a need to install and execute the software applications on node 430. For example, application 415-1 may include software associated with data lineage platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system ("OS"). A process virtual machine may execute a single program and may support a single process. In some implementations, virtual machine 415-2 may execute on behalf of a user (e.g., node 430), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the guest operating systems and may manage the execution of the guest operating systems. Multiple instances of a variety of operating systems may share virtualized hardware resources.

Node 430 includes one or more devices capable of receiving, generating, storing, processing, and/or providing information associated with an update to a dataset. For example, node 430 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. Nodes 430 may correspond to the nodes described in connection with example implementation 100, example implementation 200, and/or example implementation 300.

Data platform 440 includes one or more devices capable of hosting an application used to receive, generate, store, process, and/or provide information that is used to perform an update associated with a dataset. The data platform may be any data platform that is available to nodes 430. For example, data platform 440 may be an online platform (e.g., a web-based platform), a cloud-based platform, a non-cloud-based platform, and/or the like that can be used to host an application that enables access and/or updates to a dataset. Such an application may include a document processing application, a data management application, a data analytics application, a machine learning application, a data stream application, and/or the like. Accordingly, nodes 430 may interact with datasets associated with data platform 440 via the application. Data platform 440 may correspond to the data platform of example implementation 100.

Data storage device 450 includes may include one or more devices capable of receiving, generating, storing, processing, and/or providing information associated with a dataset. For example, data storage device 450 may include a computing device, such as a server, a desktop computer, a laptop computer, a tablet computer, a handheld computer, or a similar device. Data storage device 450 may support a distributed ledger system that uses a data structure (e.g., a blockchain) to store lineage records associated with datasets managed by data lineage platform 410, as described herein.

Network 460 includes one or more wired and/or wireless networks. For example, network 460 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
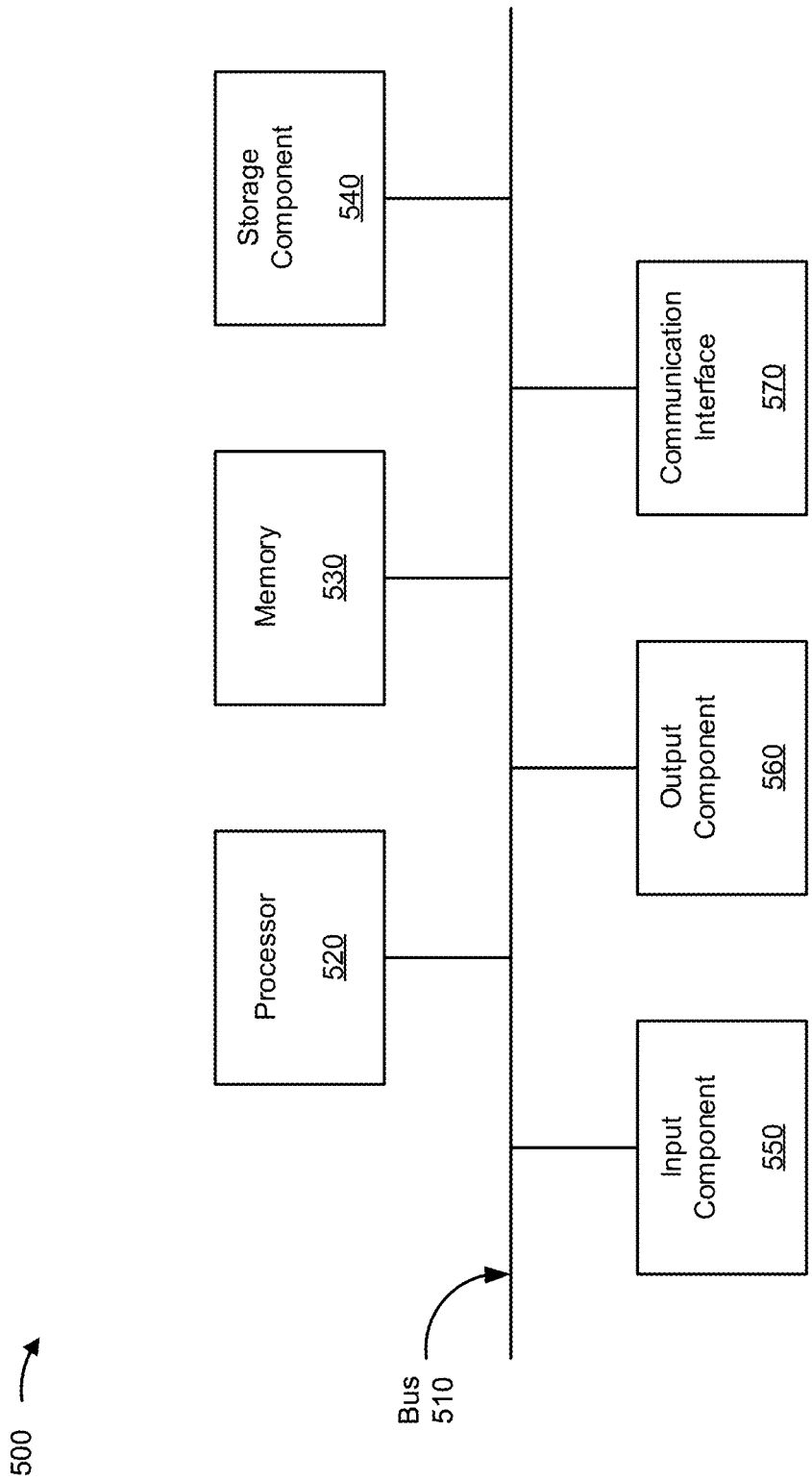
FIG. 5 is a diagram of example components of one or more devices of FIG. 4.

FIG. 5 is a diagram of example components of a device 500. Device 500 may correspond to data lineage platform 410, computing resource 415, node 430, data platform 440, and/or data storage device 450. In some implementations, data lineage platform 410, computing resource 415, node 430, data platform 440, and/or data storage device 450 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
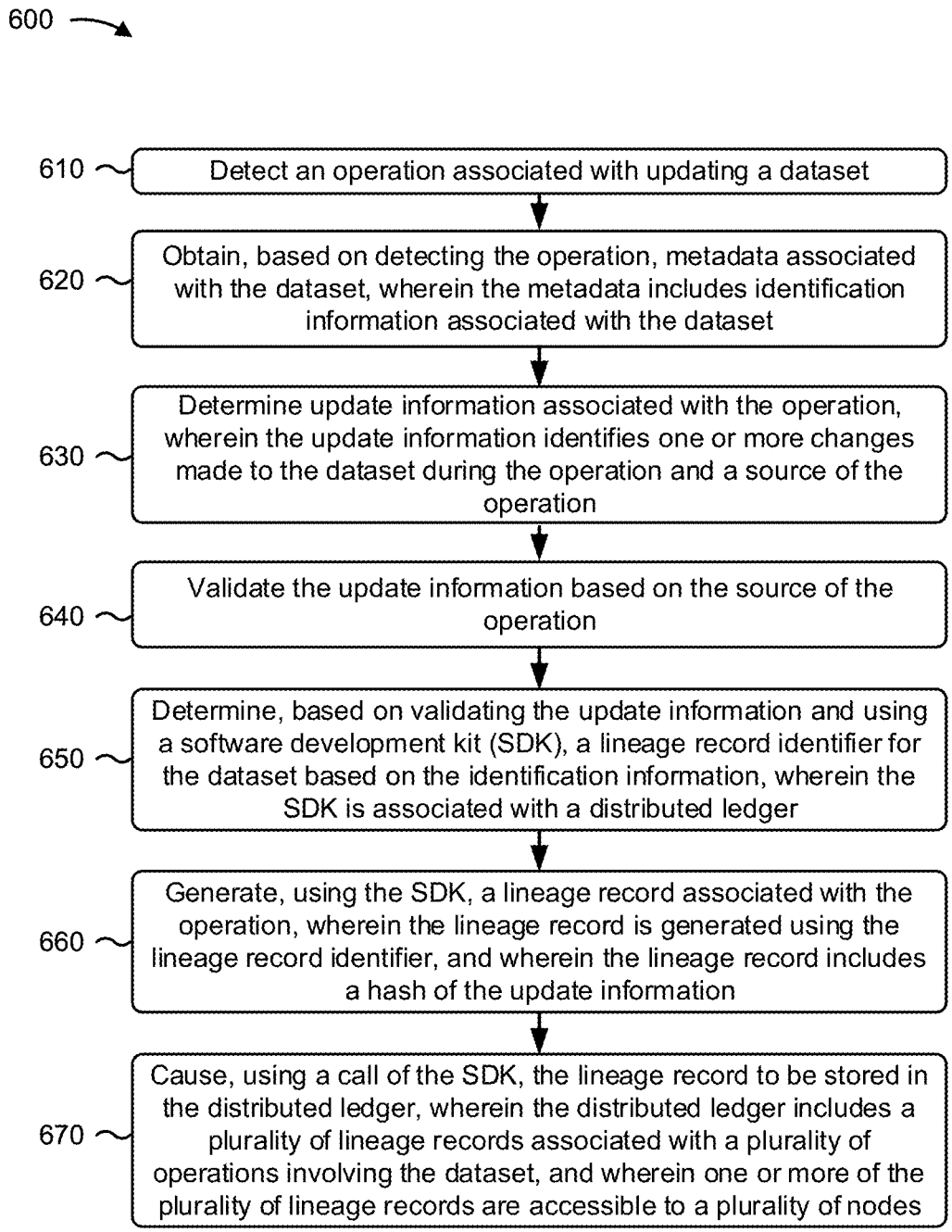
FIGS. 6-9 are flowcharts of one or more example processes for data lineage management.

FIG. 6 is a flow chart of an example process 600 for data lineage management. In some implementations, one or more process blocks of FIG. 6 may be performed by a data lineage platform (e.g., data lineage platform 410). In some implementations, one or more process blocks of FIG. 6 may be performed by another device or a group of devices separate from or including the data lineage platform, such as a node (e.g., node 430), a data platform (e.g., data platform 440), and/or the like.

As shown in FIG. 6, process 600 may include detecting an operation associated with updating a dataset (block 610). For example, the data lineage platform (e.g., using processor 520, memory 530, storage component 540, input component 550, output component 560, communication interface 570 and/or the like) may detect an operation associated with updating a dataset, as described above.

As further shown in FIG. 6, process 600 may include obtaining, based on detecting the operation, metadata associated with the dataset, wherein the metadata includes identification information associated with the dataset (block 620). For example, the data lineage platform (e.g., using processor 520, memory 530, storage component 540, input component 550, output component 560, communication interface 570 and/or the like) may obtain, based on detecting the operation, metadata associated with the dataset, as described above. In some implementations, the metadata includes identification information associated with the dataset.

As further shown in FIG. 6, process 600 may include determining update information associated with the operation, wherein the update information identifies one or more changes made to the dataset during the operation and a source of the operation (block 630). For example, the data lineage platform (e.g., using processor 520, memory 530, storage component 540, input component 550, output component 560, communication interface 570 and/or the like) may determine update information associated with the operation, as described above. In some implementations, the update information identifies one or more changes made to the dataset during the operation and a source of the operation.

As further shown in FIG. 6, process 600 may include validating the update information based on the source of the operation (block 640). For example, the data lineage platform (e.g., using processor 520, memory 530, storage component 540, input component 550, output component 560, communication interface 570 and/or the like) may validate the update information based on the source of the operation, as described above.

As further shown in FIG. 6, process 600 may include determining, based on validating the update information and using a software development kit (SDK), a lineage record identifier for the dataset based on the identification information, wherein the SDK is associated with a distributed ledger (block 650). For example, the data lineage platform (e.g., using processor 520, memory 530, storage component 540, input component 550, output component 560, communication interface 570 and/or the like) may determine, based on validating the update information and using a software development kit (SDK), a lineage record identifier for the dataset based on the identification information, as described above. In some implementations, the SDK is associated with a distributed ledger.

As further shown in FIG. 6, process 600 may include generating, using the SDK, a lineage record associated with the operation, wherein the lineage record is generated using the lineage record identifier and the lineage record includes a hash of the update information (block 660). For example, the data lineage platform (e.g., using processor 520, memory 530, storage component 540, input component 550, output component 560, communication interface 570 and/or the like) may generate, using the SDK, a lineage record associated with the operation, as described above. In some implementations, the lineage record is generated using the lineage record identifier. In some implementations, the lineage record includes a hash of the update information.

As further shown in FIG. 6, process 600 may include causing, using a call of the SDK, the lineage record to be stored in the distributed ledger, wherein the distributed ledger includes a plurality of lineage records associated with a plurality of operations involving the dataset and one or more of the plurality of lineage records are accessible to a plurality of nodes (block 670). For example, the data lineage platform (e.g., using processor 520, memory 530, storage component 540, input component 550, output component 560, communication interface 570 and/or the like) may cause, using a call of the SDK, the lineage record to be stored in the distributed ledger, as described above. In some implementations, the distributed ledger includes a plurality of lineage records associated with a plurality of operations involving the dataset. In some implementations, one or more of the plurality of lineage records are accessible to a plurality of nodes.

Process 600 may include additional implementations, such as any single implementation or any combination of implementations described below and/or in connection with one or more other processes described elsewhere herein.

In a first implementation, the update information is validated based on an authentication received from the source of the operation. In a second implementation, alone or in combination with the first implementation, the update information is validated based on authentication messages received from the plurality of nodes.

In a third implementation, alone or in combination with one or more of the first and second implementations, the SDK is further associated with a protocol of an online platform that manages the dataset. In a fourth implementation, alone or in combination with one or more of the first through third implementations, the distributed ledger comprises a blockchain, and the lineage record is stored in a block of the blockchain.

In a fifth implementation, alone or in combination with one or more of the first through fourth implementations, the update information is obtained from the source recording the one or more changes in an update log. In a sixth implementation, alone or in combination with one or more of the first through fifth implementations, the lineage record and the plurality of lineage records permit the plurality of nodes to determine a current state of the dataset. In a seventh implementation, alone or in combination with one or more of the first through sixth implementations, the dataset comprises at least one of a data stream or a file.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
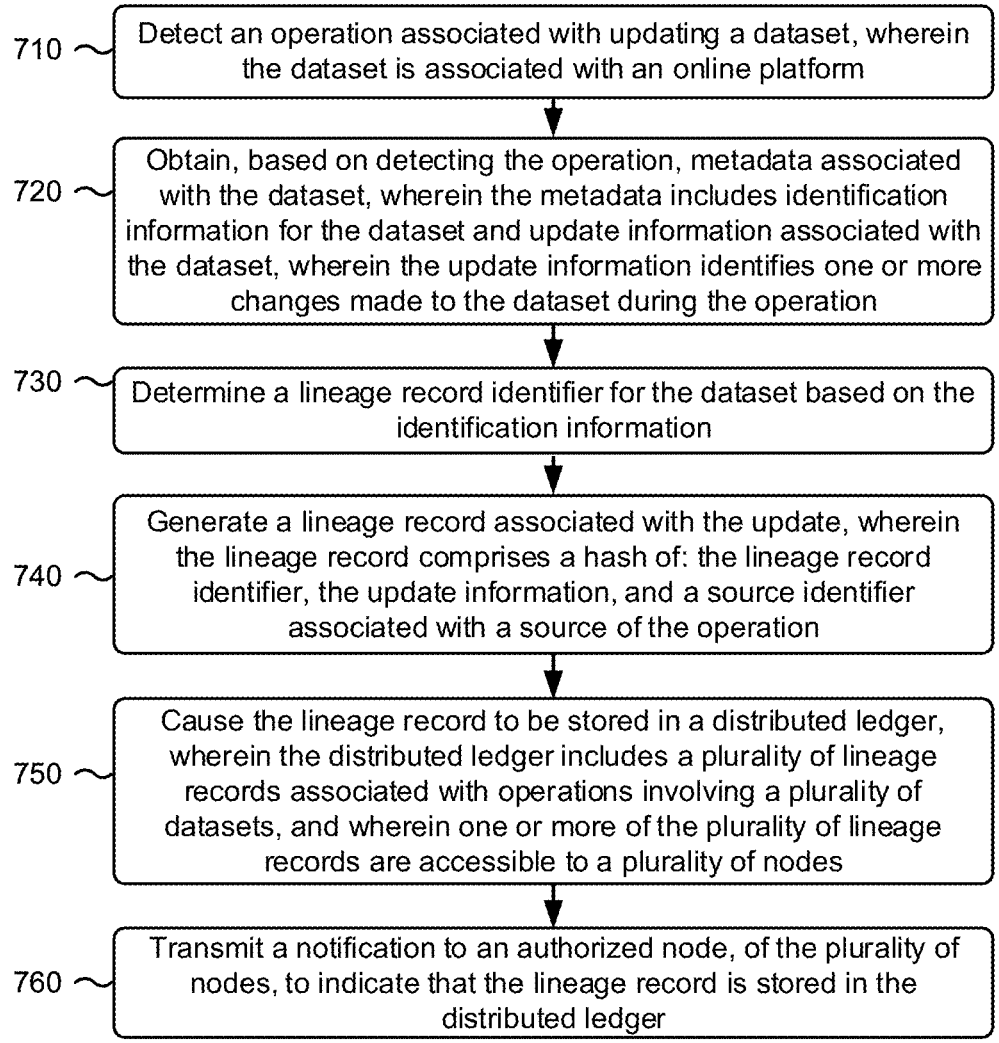

FIG. 7 is a flow chart of an example process 700 for data lineage management. In some implementations, one or more process blocks of FIG. 7 may be performed by a data lineage platform (e.g., data lineage platform 410). In some implementations, one or more process blocks of FIG. 7 may be performed by another device or a group of devices separate from or including the data lineage platform, such as a node (e.g., node 430), a data platform (e.g., data platform 440), and/or the like.

As shown in FIG. 7, process 700 may include detecting an operation associated with updating a dataset, wherein the dataset is associated with an online platform (block 710). For example, the data lineage platform (e.g., using processor 520, memory 530, storage component 540, input component 550, output component 560, communication interface 570 and/or the like) may detect an operation associated with updating a dataset, as described above. In some implementations, the dataset is associated with an online platform.

As further shown in FIG. 7, process 700 may include obtaining, based on detecting the operation, metadata associated with the dataset, wherein the metadata includes identification information for the dataset and update information associated with the dataset, and the update information identifies one or more changes made to the dataset during the operation (block 720). For example, the data lineage platform (e.g., using processor 520, memory 530, storage component 540, input component 550, output component 560, communication interface 570 and/or the like) may obtain, based on detecting the operation, metadata associated with the dataset, as described above. In some implementations, the metadata includes identification information for the dataset and update information associated with the dataset. In some implementations, the update information identifies one or more changes made to the dataset during the operation.

As further shown in FIG. 7, process 700 may include determining a lineage record identifier for the dataset based on the identification information (block 730). For example, the data lineage platform (e.g., using processor 520, memory 530, storage component 540, input component 550, output component 560, communication interface 570 and/or the like) may determine a lineage record identifier for the dataset based on the identification information, as described above.

As further shown in FIG. 7, process 700 may include generating a lineage record associated with the update, wherein the lineage record comprises a hash of the lineage record identifier, the update information, and a source identifier associated with a source of the operation (block 740). For example, the data lineage platform (e.g., using processor 520, memory 530, storage component 540, input component 550, output component 560, communication interface 570 and/or the like) may generate a lineage record associated with the update, as described above. In some implementations, the lineage record comprises a hash of: the lineage record identifier, the update information, and a source identifier associated with a source of the operation.

As further shown in FIG. 7, process 700 may include causing the lineage record to be stored in a distributed ledger, wherein the distributed ledger includes a plurality of lineage records associated with operations involving a plurality of datasets and one or more of the plurality of lineage records are accessible to a plurality of nodes (block 750). For example, the data lineage platform (e.g., using processor 520, memory 530, storage component 540, input component 550, output component 560, communication interface 570 and/or the like) may cause the lineage record to be stored in a distributed ledger, as described above. In some implementations, the distributed ledger includes a plurality of lineage records associated with operations involving a plurality of datasets. In some implementations, one or more of the plurality of lineage records are accessible to a plurality of nodes.

As further shown in FIG. 7, process 700 may include transmitting a notification to an authorized node, of the plurality of nodes, to indicate that the lineage record is stored in the distributed ledger (block 760). For example, the data lineage platform (e.g., using processor 520, memory 530, storage component 540, input component 550, output component 560, communication interface 570 and/or the like) may transmit a notification to an authorized node, of the plurality of nodes, to indicate that the lineage record is stored in the distributed ledger, as described above.

Process 700 may include additional implementations, such as any single implementation or any combination of implementations described below and/or in connection with one or more other processes described elsewhere herein.

In a first implementation, the dataset is accessible to the authorized node of the plurality of nodes via the online platform. In a second implementation, alone or in combination with the first implementation, the operation includes modifying the dataset via an application associated with the online platform. In a third implementation, alone or in combination with one or more of the first and second implementations, the update information is validated based on an authentication received from the authorized node.

In a fourth implementation, alone or in combination with one or more of the first through third implementations, the one or more changes comprise at least one of: a change to the identification information of the dataset, a change to a format of the dataset, a copy of the dataset being created, an addition of data to the dataset, a removal of data from the dataset, or a replacement of data in the dataset. In a fifth implementation, alone or in combination with one or more of the first through fourth implementations, the metadata is obtained from at least one of a log file associated with the dataset or a code repository associated with the online platform.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
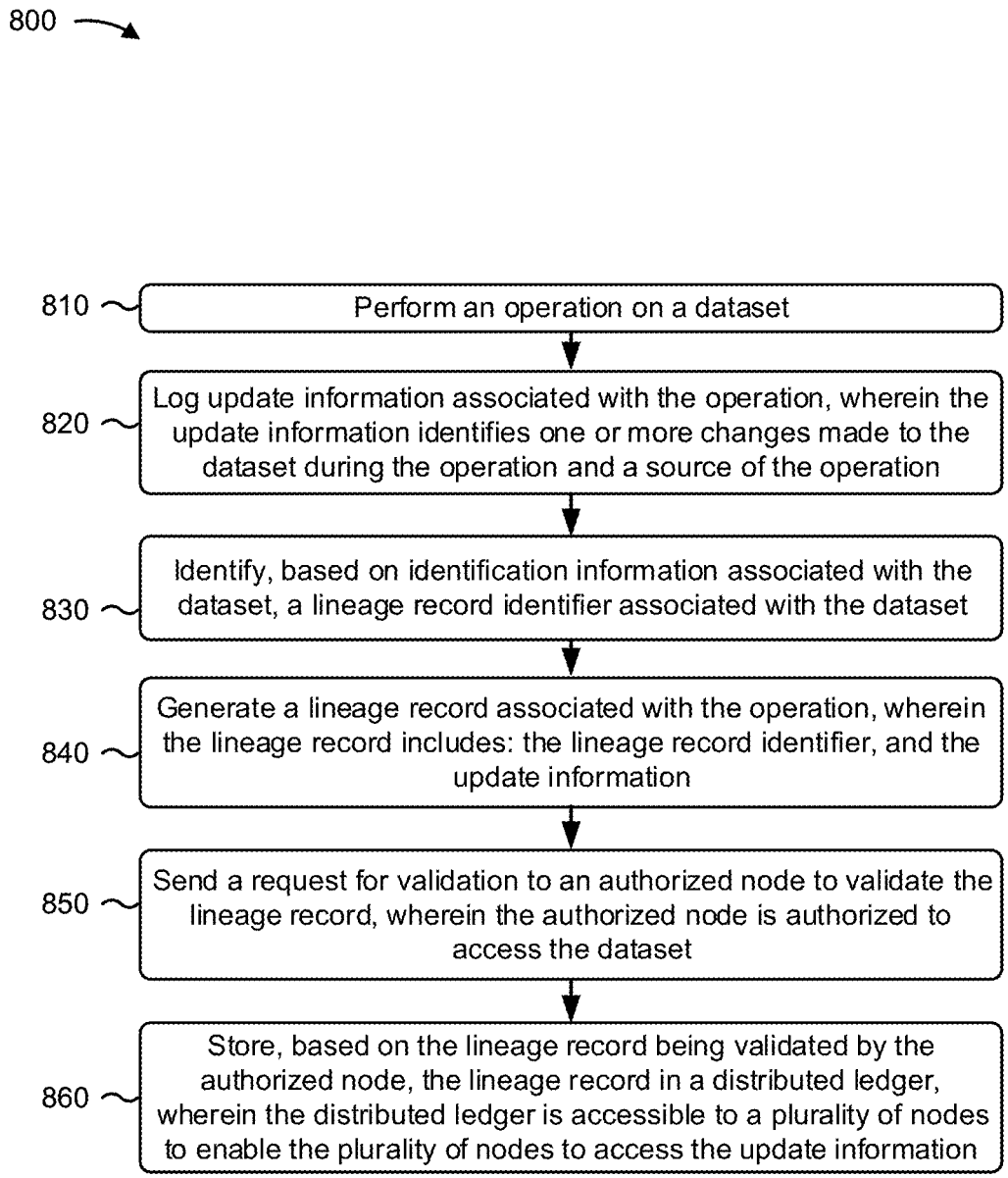

FIG. 8 is a flow chart of an example process 800 for data lineage management. In some implementations, one or more process blocks of FIG. 8 may be performed by a data lineage platform (e.g., data lineage platform 410). In some implementations, one or more process blocks of FIG. 8 may be performed by another device or a group of devices separate from or including the data lineage platform, such as a node (e.g., node 430), a data platform (e.g., data platform 440), and/or the like.

As shown in FIG. 8, process 800 may include performing an operation on a dataset (block 810). For example, the data lineage platform (e.g., using processor 520, memory 530, storage component 540, input component 550, output component 560, communication interface 570 and/or the like) may perform an operation on a dataset, as described above.

As further shown in FIG. 8, process 800 may include logging update information associated with the operation, wherein the update information identifies one or more changes made to the dataset during the operation and a source of the operation (block 820). For example, the data lineage platform (e.g., using processor 520, memory 530, storage component 540, input component 550, output component 560, communication interface 570 and/or the like) may log update information associated with the operation, as described above. In some implementations, the update information identifies one or more changes made to the dataset during the operation and a source of the operation.

As further shown in FIG. 8, process 800 may include identifying, based on identification information associated with the dataset, a lineage record identifier associated with the dataset (block 830). For example, the data lineage platform (e.g., using processor 520, memory 530, storage component 540, input component 550, output component 560, communication interface 570 and/or the like) may identify, based on identification information associated with the dataset, a lineage record identifier associated with the dataset, as described above.

As further shown in FIG. 8, process 800 may include generating a lineage record associated with the operation, wherein the lineage record includes the lineage record identifier and the update information (block 840). For example, the data lineage platform (e.g., using processor 520, memory 530, storage component 540, input component 550, output component 560, communication interface 570 and/or the like) may generate a lineage record associated with the operation, as described above. In some implementations, the lineage record includes the lineage record identifier and the update information.

As further shown in FIG. 8, process 800 may include sending a request for validation to an authorized node to validate the lineage record, wherein the authorized node is authorized to access the dataset (block 850). For example, the data lineage platform (e.g., using processor 520, memory 530, storage component 540, input component 550, output component 560, communication interface 570 and/or the like) may send a request for validation to an authorized node to validate the lineage record, as described above. In some implementations, the authorized node is authorized to access the dataset.

As further shown in FIG. 8, process 800 may include storing, based on the lineage record being validated by the authorized node, the lineage record in a distributed ledger, wherein the distributed ledger is accessible to a plurality of nodes to enable the plurality of nodes to access the update information (block 860). For example, the data lineage platform (e.g., using processor 520, memory 530, storage component 540, input component 550, output component 560, communication interface 570 and/or the like) may store, based on the lineage record being validated by the authorized node, the lineage record in a distributed ledger, as described above. In some implementations, the distributed ledger is accessible to a plurality of nodes to enable the plurality of nodes to access the update information.

Process 800 may include additional implementations, such as any single implementation or any combination of implementations described below and/or in connection with one or more other processes described elsewhere herein.

In a first implementation, the lineage record further includes a source identifier associated with a device. In a second implementation, alone or in combination with the first implementation, the request for validation includes a notification that the operation was performed by the device.

In a third implementation, alone or in combination with one or more of the first and second implementations, the request for validation includes a hash of the lineage record. In a fourth implementation, alone or in combination with one or more of the first through third implementations, the lineage record is generated using a software development kit (SDK) associated with the distributed ledger. In a fifth implementation, alone or in combination with one or more of the first through fourth implementations, the operation is performed via an online platform that manages the dataset.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
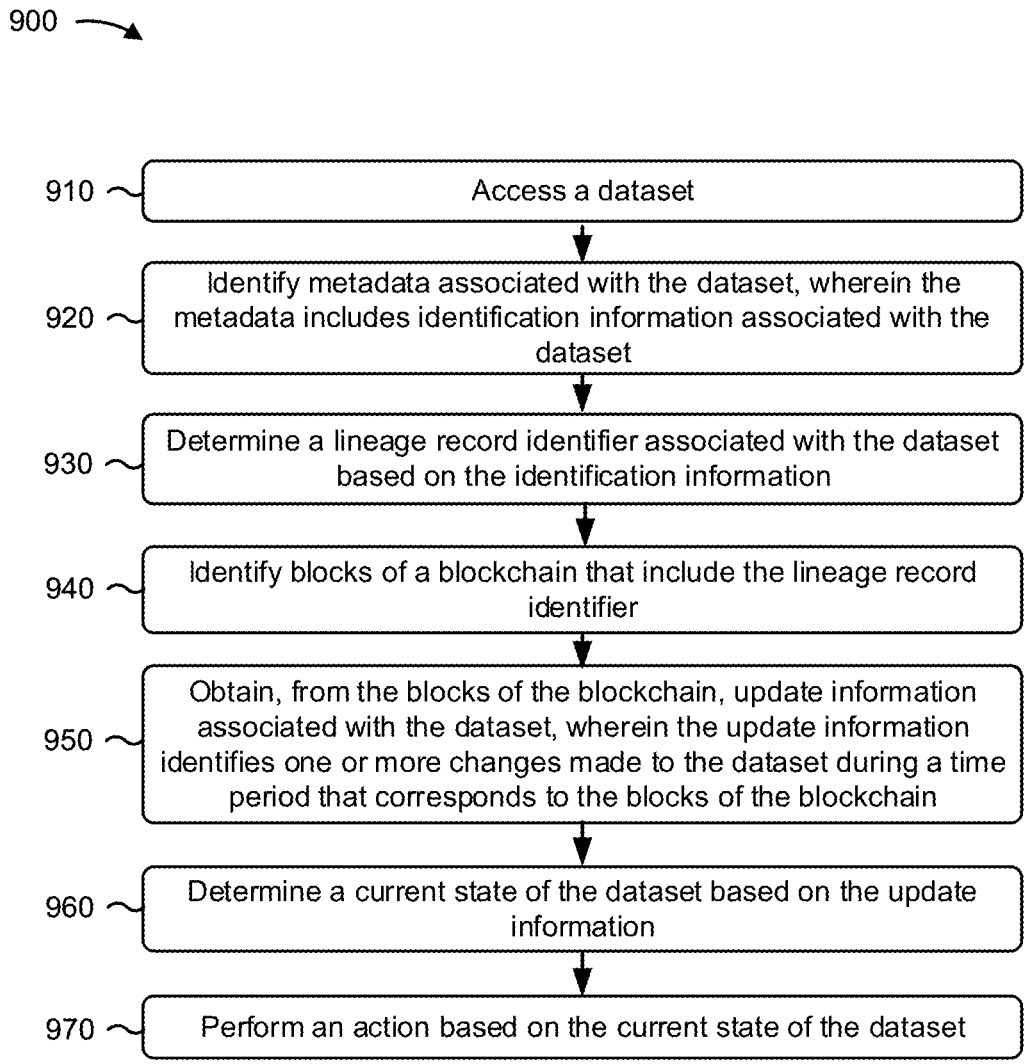

FIG. 9 is a flow chart of an example process 900 for data lineage management. In some implementations, one or more process blocks of FIG. 9 may be performed by a data lineage platform (e.g., data lineage platform 410). In some implementations, one or more process blocks of FIG. 9 may be performed by another device or a group of devices separate from or including the data lineage platform, such as a node (e.g., node 430), a data platform (e.g., data platform 440), and/or the like.

As shown in FIG. 9, process 900 may include accessing a dataset (block 910). For example, the data lineage platform (e.g., using processor 520, memory 530, storage component 540, input component 550, output component 560, communication interface 570 and/or the like) may access a dataset, as described above.

As further shown in FIG. 9, process 900 may include identifying metadata associated with the dataset, wherein the metadata includes identification information associated with the dataset (block 920). For example, the data lineage platform (e.g., using processor 520, memory 530, storage component 540, input component 550, output component 560, communication interface 570 and/or the like) may identify metadata associated with the dataset, as described above. In some implementations, the metadata includes identification information associated with the dataset.

As further shown in FIG. 9, process 900 may include determining a lineage record identifier associated with the dataset based on the identification information (block 930). For example, the data lineage platform (e.g., using processor 520, memory 530, storage component 540, input component 550, output component 560, communication interface 570 and/or the like) may determine a lineage record identifier associated with the dataset based on the identification information, as described above.

As further shown in FIG. 9, process 900 may include identifying blocks of a blockchain that include the lineage record identifier (block 940). For example, the data lineage platform (e.g., using processor 520, memory 530, storage component 540, input component 550, output component 560, communication interface 570 and/or the like) may identify blocks of a blockchain that include the lineage record identifier, as described above.

As further shown in FIG. 9, process 900 may include obtaining, from the blocks of the blockchain, update information associated with the dataset, wherein the update information identifies one or more changes made to the dataset during a time period that corresponds to the blocks of the blockchain (block 950). For example, the data lineage platform (e.g., using processor 520, memory 530, storage component 540, input component 550, output component 560, communication interface 570 and/or the like) may obtain, from the blocks of the blockchain, update information associated with the dataset, as described above. In some implementations, the update information identifies one or more changes made to the dataset during a time period that corresponds to the blocks of the blockchain.

As further shown in FIG. 9, process 900 may include determining a current state of the dataset based on the update information (block 960). For example, the data lineage platform (e.g., using processor 520, memory 530, storage component 540, input component 550, output component 560, communication interface 570 and/or the like) may determine a current state of the dataset based on the update information, as described above.

As further shown in FIG. 9, process 900 may include performing an action based on the current state of the dataset (block 970). For example, the data lineage platform (e.g., using processor 520, memory 530, storage component 540, input component 550, output component 560, communication interface 570 and/or the like) may perform an action based on the current state of the dataset, as described above.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  accessing, by a device, a dataset;
  identifying, by the device, metadata associated with the dataset,
    wherein the metadata includes identification information associated with the dataset;
  determining, by the device, a lineage record identifier associated with the dataset based on the identification information;
    wherein a lineage record associated with the lineage record identifier is generated using a software development kit (SDK), and
    wherein the SDK is configured to utilize a particular protocol in determining content to be included in the lineage record;
  identifying, by the device, one or more blocks of a blockchain that include the lineage record identifier;
  obtaining, by the device and from the one or more blocks of the blockchain, update information associated with the dataset,
    wherein the update information identifies one or more changes made to the dataset by another device during a time period that corresponds to the one or more blocks of the blockchain;
  determining, by the device and based on the update information, a first state corresponding to the one or more changes made to the dataset by the other device;
  determining, by the device, a second state associated with the dataset as accessed by the device; and performing, by the device, based on the first state, and based on the second state, one or more updates to the dataset to generate an updated dataset that corresponds to the first state.

2. The method of claim 1, further comprising:
validating the update information based on authentication messages received from a source associated with the update information.

3. The method of claim 1, further comprising:
validating the update information based upon authentication of the other device associated with the update information.

4. The method of claim 1, wherein, when generating the updated dataset, the method includes:
adding a new block to the one or more blocks of the blockchain.

5. The method of claim 1, wherein the dataset comprises at least one of:
a data stream, or
a file.

6. The method of claim 1, wherein the one or more changes made by the other device comprise at least one of:
a change to the identification information of the dataset,
a change to a format of the dataset,
a copy of the dataset being created,
an addition of data to the dataset,
a removal of data from the dataset, or
a replacement of data in the dataset.

7. A device, comprising:
one or more memories; and
one or more processors communicatively coupled to the one or more memories, configured to:
determine metadata associated with a dataset,
wherein the metadata includes identification information associated with the dataset;
determine a lineage record identifier associated with the dataset based on the identification information,
the lineage record identifier being associated with one or more blocks of a blockchain,
wherein a lineage record associated with the lineage record identifier is generated using a software development kit (SDK), and
wherein the SDK is configured to utilize a particular protocol in determining content to be included in the lineage record;
obtain, from the one or more blocks of the blockchain, update information associated with the dataset,
wherein the update information identifies one or more changes made to the dataset by another device during a time period that corresponds to the one or more blocks of the blockchain;
determine, based on the update information, a first state corresponding to the one or more changes made to the dataset by the other device;
determine a second state associated with the dataset as accessed by the device; and
perform, based on the first state, and based on the second state, one or more updates to the dataset to generate an updated dataset that corresponds to the first state.

8. The device of claim 7, wherein the metadata is obtained from at least one of:
a log file associated with the dataset, or
a code repository associated with an online platform.

9. The device of claim 7, wherein the one or more processors are further configured to:
validate the update information based upon authentication of the other device associated with the update information.

10. The device of claim 7, wherein, when generating the updated dataset, the one or more processors are further to:
add a new block to the one or more blocks of the blockchain.

11. The device of claim 7, wherein the one or more blocks of the blockchain each include one or more lineage records.

12. The device of claim 7, wherein a first block, of the one or more blocks of the blockchain, includes a first lineage record associated with an update to a file and a second block, of the one or more blocks of the blockchain, includes a second lineage record for a subsequent update.

13. A non-transitory computer-readable medium storing instructions, the instructions comprising:
one or more instructions that, when executed by one or more processors of a device, cause the one or more processors to:
access a dataset;
identify identification information associated with the dataset;
determine a lineage record identifier associated with the dataset based on the identification information,
wherein a lineage record associated with the lineage record identifier is generated using a software development kit (SDK), and
wherein the SDK is configured to utilize a particular protocol in determining content to be included in the lineage record;
identify one or more blocks of a blockchain that include the lineage record identifier;
obtain, from the one or more blocks of the blockchain, update information associated with the dataset,
wherein the update information identifies one or more changes made to the dataset by another device;
determine, based on the update information, a first state corresponding to the one or more changes made to the dataset by the other device;
determine a second state associated with the dataset as accessed by the device; and
perform, based on the first state, and based on the second state, one or more updates to the dataset to generate an updated dataset that corresponds to the first state.

14. The non-transitory computer-readable medium of claim 13, wherein the dataset is accessible to an authorized device of a plurality of devices via an online platform.

15. The non-transitory computer-readable medium of claim 13, wherein the lineage record identifier is associated with a lineage record, and
wherein the lineage record comprises a hash of:
the lineage record identifier,
the update information, and
a source identifier associated with a source of an operation associated with the update information.

16. The non-transitory computer-readable medium of claim 13, wherein the one or more instructions, when executed by the one or more processors of the device, further cause the one or more processors to:
validate the update information based upon authentication of the other device associated with the update information.

17. The non-transitory computer-readable medium of claim 13, wherein the one or more instructions, that cause the one or more processors to generate the updated dataset, cause the one or more processors to:

add a new block to the one or more blocks of the blockchain.

18. The method of claim 1, wherein the update information is added to the blockchain after validation and before the device obtains the update information.

19. The device of claim 7, wherein the update information is added to the blockchain after validation and before the device obtains the update information.

20. The non-transitory computer-readable medium of claim 13, wherein the update information is added to the blockchain after validation and before the device obtains the update information.

* * * * *